June 1, 1937.    M. S. KHARASCH ET AL    2,082,342
PROCESS OF OBTAINING AN EFFECTIVE ERGOT PREPARATION
Filed March 17, 1934
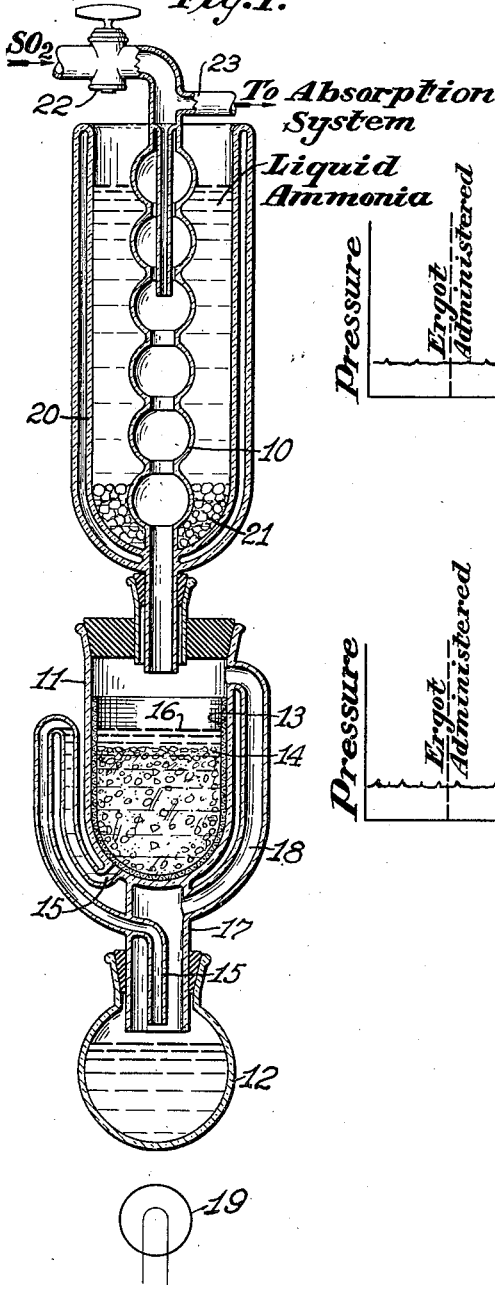
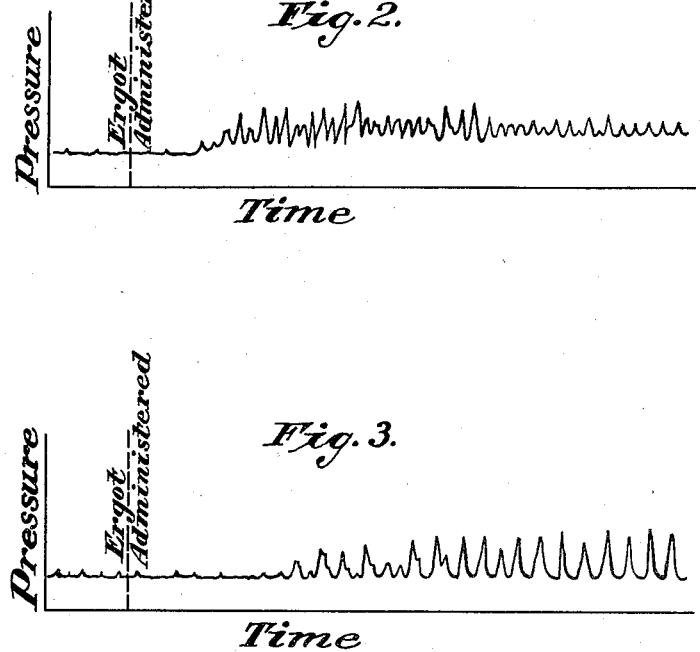
Inventors
MORRIS S. KHARASCH.
ROMEO RALPH LEGAULT.

Patented June 1, 1937

2,082,342

UNITED STATES PATENT OFFICE 2,082,342

PROCESS OF OBTAINING AN EFFECTIVE ERGOT PREPARATION

Morris S. Kharasch and Romeo Ralph Legault, Chicago, Ill., assignors to Eli Lilly and Company, Indianapolis, Ind., a corporation of Indiana Application March 17, 1934, Serial No. 716,158

4 Claims. (Cl. 87—28)

It is the object of our invention to obtain ergot alkaloids which are stable, which can be administered in solid form as well as in solution, and which have a physiological effect which permits their safe administration under certain conditions when it is unsafe to administer the ordinary ergot products, especially just prior to labor; and which can be obtained with large yields from the original ergot.

It is a further object of our invention to obtain an ergot product free from the disagreeable taste characteristic of U. S. P. ergot; and, furthermore, an ergot extract which contains more of the active principle of ergot per unit of weight than is obtained by the ordinary U. S. P. method.

Our invention involves both a new method and a new product.

Fundamentally, our method involves an extraction of ergot, desirably although not necessarily after certain undesirable fractions thereof have been removed by other means, by substantially dry liquid sulphur dioxide, at rather low temperature. While the particular type of extraction apparatus is immaterial, we prefer one which produces a continuous and repeated percolation of liquid sulphur dioxide through the ergot; such as a modified Soxhlet apparatus, in which liquid sulphur dioxide in the Soxhlet receiver is vaporized, the vapor rises to a cooling column at which it is recondensed into liquid phase and from which the liquefied sulphur dioxide drops back through a porous container which contains the ergot being extracted and thence into the Soxhlet receiver. The cooling column is kept sufficiently cool in any convenient manner, as by being immersed in liquid ammonia.

The sulphur-dioxide extract thus obtained is rich in ergot alkaloids, which may readily be obtained in solid form by simple evaporation of the sulphur dioxide. These ergot alkaloids as thus obtained have certain advantages over previously known ergot preparations, as will appear.

The extraction of ergot by sulphur dioxide has a number of definite advantages, among which are:

1. The extraction is at low temperature, so that the relatively destructive effects of higher temperature extraction are avoided.

2. The extracting solvent is acidic in character; and this avoids difficulties inherent in the use of alkaline extracting solvents, and makes for stability of the product.

3. The extracting solvent tends to retard if not to prevent oxidation due to the oxygen of the air.

4. A dry solid is readily obtained, in a form in which it can be administered by mouth.

5. This dry solid has excellent keeping qualities, so that it retains its potency over longer periods and deteriorates much less rapidly than prior ergot preparations.

6. The yield is high, for about 1.1 milligrams of ergot alkaloid is obtained per gram of original ergot, as against 0.7 to 0.9 milligram by earlier methods.

7. The taste of the material in the form of a fluid extract has none of the unpleasant qualities characteristic of the U. S. P. product.

8. The sulphur dioxide extracts less of the extraneous materials present in ergot, and therefore weight for weight the solid obtained by this method is more effective than is that obtained by evaporation of the fluid extract of ergot prepared according to the U. S. P. method. In fact our extract per unit of activity contains only one-fifteenth to one-twentieth of the total solids obtained by the U. S. P. method.

9. Perhaps most important of all, our experiments indicate that the ergot alkaloids obtained by sulphur-dioxide extraction, when administered by mouth either with or without an enteric coating, produce a character of uterine contraction which has certain unique properties; in that although the contractions are produced as with other ergot preparations, there is not produced the elevation of the basal line which other ergot preparations give and which make such other ergot preparations unsafe to administer at certain periods. In other words, our ergot preparation causes rhythmic contraction of the uterus, as other ergot preparations also do; but it allows complete relaxation between uterine contractions, which is not the case with previously known ergot preparations. Therefore, a material obtained by our process can be used with both safety and advantage prior to delivery; which is now considered unsafe with other ergot preparations because of the elevation produced in the basal line.

The accompanying drawing will aid in an understanding of our invention. In such drawing, Fig. 1 is a vertical central section, somewhat schematic, of a modified Soxhlet apparatus which we have found effective for carrying out our process of extraction; Fig. 2 is a kymograph chart showing the general character of uterine contractions produced by prior ergot preparations; and Fig. 3 is another kymograph chart showing the general character of uterine contractions produced by our ergot preparation.

The modified Soxhlet apparatus shown in Fig. 1 has three main portions—a condenser 10, an extractor 11, and a receiver 12.

The extractor 11 is provided with the usual Soxhlet thimble 13 of porous paper, which is filled to the desired level with the ergot 14 to be extracted. The extractor 11 is provided near the bottom with an outlet passage 15 for the extract; and this outlet passage extends first upward to the level at which it is desired to maintain the liquid level 16 in the extractor 11, and thence downward into and downward within the tube 17 by which the extractor 11 is mounted in the mouth of the receiver 12. The tube 17 near its top opens into a lateral passage 18 which leads to the upper part of the extractor 11, above the liquid level therein. The receiver 12 may be suitably heated, when and if desired, as by the heat of an incandescent lamp 19.

The upper end of the extractor 11 is connected to the lower end of the condenser tube 10, which is provided with a jacket 20 for holding any suitable cooling liquid. When a cooling liquid is used which has a very low boiling point, such as liquid ammonia, it is desirable that the jacket 20 be a double-walled vacuum jacket, of the Dewar type, with an open top; and it is also desirable to have some lumps 21 of silica gel in the bottom of the jacket, to prevent bumping.

The upper end of the condenser tube 10 is provided with an inlet valve 22; and desirably with a lateral outlet passage 23 to avoid having a closed system. The outlet passage 23 may lead to a suitable absorption system.

In carrying out our process of extraction, the ergot is desirably first finely ground, in a suitable mill; and then put in the thimble 13. The ground ergot may be immediately extracted with liquid sulphur dioxide; but we prefer first to defat the ergot, as a preliminary step, before the sulphur-dioxide extraction. In the defatting step, a low-boiling petroleum ether may be used, conveniently one with a boiling point of 30° to 35° C. For this extraction, the petroleum ether is put in the receiver 12, and the condenser 10 is conveniently cooled with water. The petroleum ether is suitably vaporized, (as by heat from the lamp 19,) in the usual manner; and the vapor passes by the lateral passage 18 to the top of the extractor 11 and is condensed in the condenser 10 and drops back upon the ergot 14, in the usual manner of a Soxhlet extractor. The extraction with petroleum ether is desirably continued for from 12 to 24 hours.

After a sufficient period of extraction for the desired defatting, the petroleum ether is removed from the system. For complete removal, it is desirable to spread out the defatted contents of the thimble 13 in a shallow dish, to facilitate evaporation of the petroleum ether; after which the dry and defatted powder is returned to the thimble 13 in the extractor 11.

Then an extraction with sulphur dioxide is made. For this, the open-top jacket 20 is filled fairly close to the top with liquid ammonia, which has a boiling point below that of sulphur dioxide. Sulphur dioxide in the gaseous state is admitted through the valve 22 into the condenser 10; and is there cooled and condensed, so that it drops from the lower end of the condenser on to the ergot 14. When a sufficient quantity of liquid sulphur dioxide has been introduced into the system, the valve 22 is closed. The liquid sulphur dioxide passes down through the ergot 14, and through the porous thimble 13, and out by way of the outlet passage 15 into the receiver 12; from which the liquid sulphur dioxide is vaporized to pass upward from the receiver 12 by way of the lateral passage 18 into the upper end of the extractor 11, to be reliquefied in the condenser 10 and repeat its passage through the ergot. Because of the low boiling point of sulphur dioxide, it is often not necessary to supply any heat to the receiver 12; although the cycle is speeded up by applying slight heat, as of the electric lamp 19.

The extraction with the sulphur dioxide is desirably continued for from 4 to 8 hours. Then the liquid ammonia in the jacket 20 is removed, or allowed to escape completely; so that the sulphur dioxide in the system may boil off.

The residue which remains in the receiver 12 is a brown amorphous powder, and contains the desired ergot alkaloids. It may be used as such; but we prefer to purify it somewhat. This may be done by transferring it to a small Soxhlet extractor, as by repeated washings with low-boiling ligroin, and extracting it in that extractor with ligroin. After two hours of extraction with ligroin, the amorphous residue in the extractor is a fluffy powder, still brown.

This fluffy brown powder contains the active principle of ergot, and may be administered as such, either in the solid form, conveniently in capsules or in tablets, or in a solution, as in 40% alcohol containing 0.5% tartaric acid. It is completely soluble in alcohol, almost completely soluble in ether, and only in part soluble in water.

The extraction apparatus which we have described, and some of the steps in the process, are relatively incidental, and may be varied in many ways. The fundamental point is that there shall be an extraction of ergot, whether or not previously defatted, by liquid sulphur dioxide at relatively low temperature; desirably at not to exceed 0° C., for if the pressure in the system is raised the temperature of the sulphur dioxide may also be raised, and it is not essential that the extraction be at atmospheric pressure.

The product which we obtain by our process can be administered either orally or parenterally, to produce strong oxytoctic effects. For parenteral administration it is necessary to make a suitable fluid extract of it, as for instance with a slightly acidulated alcohol-water or glycol-water mixture. For oral administration, it may be used either in the dry form or in such a fluid extract. Various acids may be used, such as hydrochloric, sulphuric, tartaric, lactic, acetic, etc. If administered in dry form it is usually convenient to put it in gelatin capsules, or in tablets; which in either case may be either plain or enteric-coated.

The relative actions of ordinary ergot preparations and of an ergot preparation produced by our process are evident from a comparison of Figs. 2 and 3. In each of these, intra-uterine pressure is traced against time by a kymograph apparatus. The intra-uterine pressure is measured in known manner, usually in millimeters of mercury, on human mothers within 5 to 8 days after delivery. The vertical dotted line in each view indicates the time of administration of the ergot preparation. Prior to the time of such administration, the intra-uterine pressure is substantially constant, with normal slight fluctuation. In other words, the uterus is inactive. Therefore, the kymograph tracing to the left of the dotted line in each of Figs. 2 and 3 represents what is called the normal basal line.

When active ergot preparations are administered, they stimulate rhythmic uterine contractions. With former ergot preparations, as shown in Fig. 2 by the kymograph tracing to the right of the vertical dotted line, these rhythmic contractions were with a raised basal line; so that the minimum pressure reached between such contractions is above the normal basal line, and the uterus does not become wholly relaxed even between contractions until the effect of the dose has substantially disappeared after a number of hours. In our preparation, in contrast, the rhythmic contractions occur as with previous ergot preparations; but the basal line is not substantially raised, and between successive contractions the uterus substantially wholly relaxes to permit the intra-uterine pressure to drop to the normal basal line, as is indicated in Fig. 3 by the kymograph tracing to the right of the vertical dotted line.

We claim as our invention:—

1. A process of obtaining an effective ergot preparation, which consists in extracting ergot with liquid sulphur dioxide, separating the extract so obtained from the ergot residue, and evaporating the sulphur dioxide to leave a solid.

2. A process of obtaining an effective ergot preparation, which consists in defatting ergot, and extracting the defatted ergot with liquid sulphur dioxide, separating the extract so obtained from the ergot residue, and evaporating the sulphur dioxide to leave a solid.

3. A process of obtaining an effective ergot preparation, which consists in extracting ergot with liquid sulphur dioxide, separating the extract so obtained from the ergot residue, evaporating the sulphur dioxide, extracting with ligroin the residue left from said evaporation, and separating the then-remaining residue from the ligroin extract.

4. The process of obtaining an effective ergot preparation, which consists in defatting ergot, extracting the defatted ergot with liquid sulphur dioxide, separating the extract so obtained from the ergot residue, evaporating the sulphur dioxide, extracting with ligroin the residue left from said evaporation, and separating the then-remaining residue from the ligroin extract.

MORRIS S. KHARASCH.
ROMEO RALPH LEGAULT.